(No Model.)  2 Sheets—Sheet 1.
W. R. TEEGUARDEN.
DRAFT ATTACHMENT FOR PLOWS OR CULTIVATORS.
No. 537,868.  Patented Apr. 23, 1895.
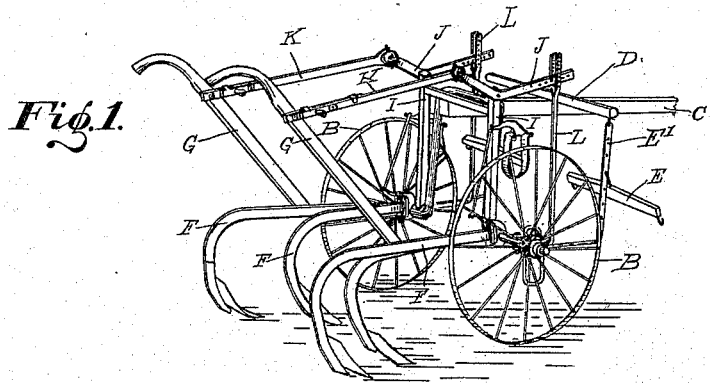
Fig. 1.
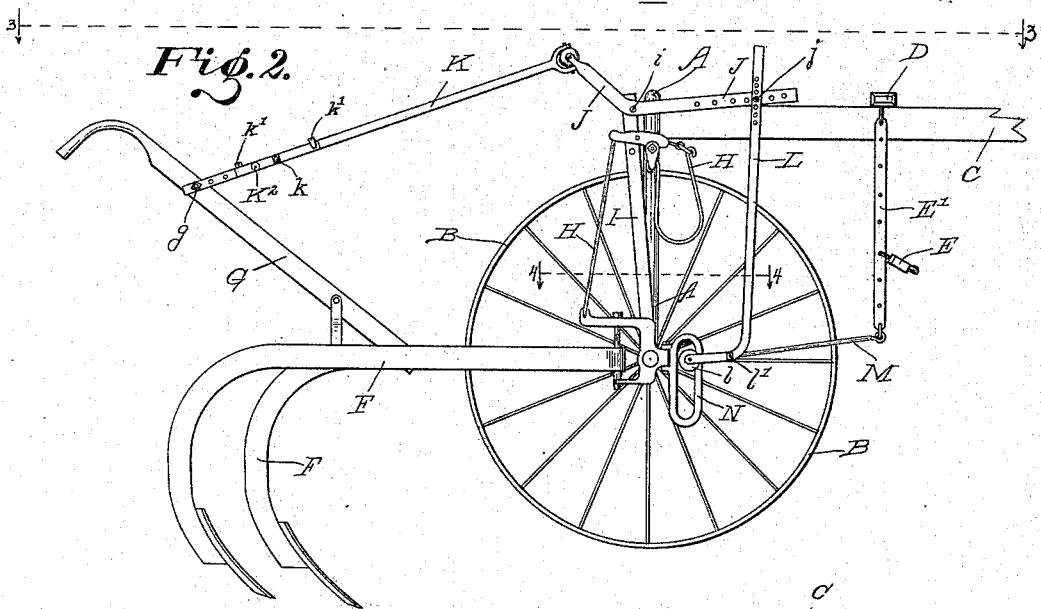
Fig. 2.
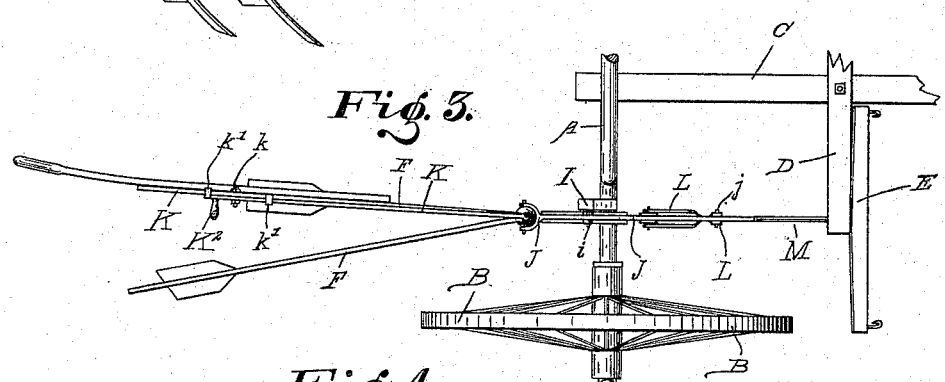
Fig. 3.
Fig. 4.
WITNESSES:
Edgar A. Kingsley
James A. Walsh
INVENTOR
William R. Teeguarden,
BY
Chester Bradford,
ATTORNEY.
THE NORRIS PETERS CO., PHOTO-LITHO., WASHINGTON, D. C.

(No Model.) 2 Sheets—Sheet 2.

W. R. TEEGUARDEN.
DRAFT ATTACHMENT FOR PLOWS OR CULTIVATORS.

No. 537,868. Patented Apr. 23, 1895.

WITNESSES:

INVENTOR
William R. Teeguarden,
BY
Chester Bradford,
ATTORNEY.

UNITED STATES PATENT OFFICE.

WILLIAM R. TEEGUARDEN, OF INDIANAPOLIS, INDIANA.

DRAFT ATTACHMENT FOR PLOWS OR CULTIVATORS.

SPECIFICATION forming part of Letters Patent No. 537,868, dated April 23, 1895.

Application filed September 29, 1894. Serial No. 524,449. (No model.)

*To all whom it may concern:*

Be it known that I, WILLIAM R. TEEGUARDEN, a citizen of the United States, residing at Indianapolis, in the county of Marion and State of Indiana, have invented certain new and useful Improvements in Draft Attachments for Plows or Cultivators, of which the following is a specification.

As is well known to farmers and others having to do with the use of such implements, plows and cultivators have a tendency to penetrate the earth more deeply when it is soft, and less deeply when it is hard; and so, in plowing or cultivating fields of variable consistency, much difficulty is experienced in securing a uniform depth of cultivation. In attempting to secure such uniform depth the operator's task is very laborious;—he having to first arrange the draft as nearly as he can for a medium consistency, and then where the ground is softer than medium lift on the handles, and where it is harder than medium bear down on the handles.

The object of my said invention is to produce such a device as will cause the plows or shovels to penetrate the ground to a uniform depth at all times, notwithstanding the earth may be of variable consistency, and thus obviate the above named disadvantages. This object is accomplished by providing a draft attachment which shall automatically exert more or less pressure upon the plow-beams as the force required to pull the plow or cultivator varies.

Figure 5:
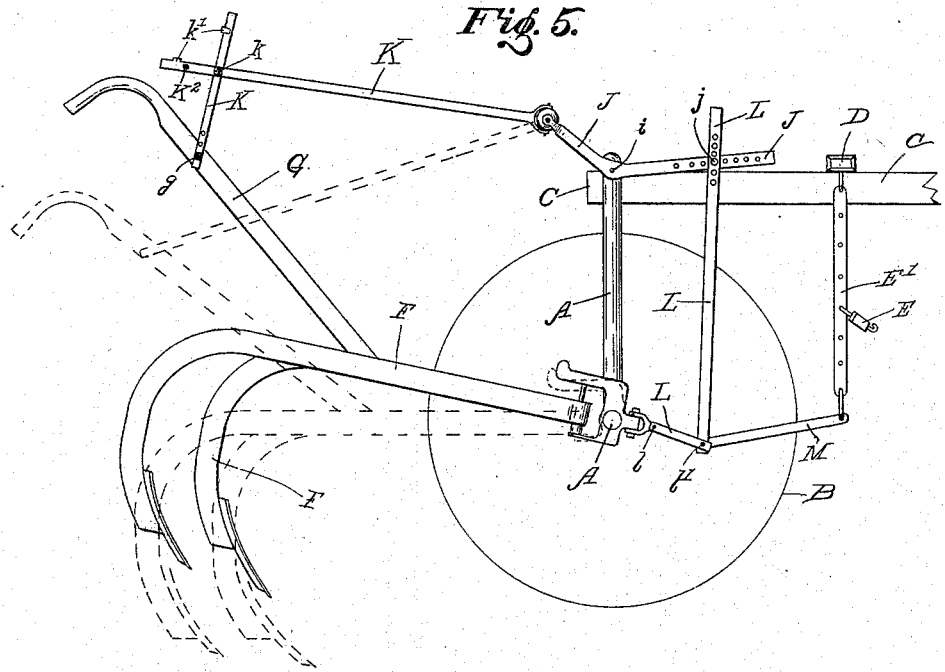

Referring to the accompanying drawings, which are made a part hereof, and on which similar letters of reference indicate similar parts, Figure 1 is a perspective view of a well known form of wheel cultivator provided with draft attachments embodying my said invention; Fig. 2, a side elevation of the same, on a somewhat larger scale, with one wheel removed to expose the mechanism more clearly; Fig. 3, a top or plan view of substantially one half the cultivator, the spring and its attachments being, however, removed to expose the mechanism of my invention more clearly; Fig. 4, a detail sectional plan view, on the dotted line 4 4 in Fig. 2; Fig. 5, a similar view to Fig. 2 showing the lever pivoted directly to the uprights of the arched axle and a jointed draft-rod pivoted to the plow clevises, and Fig. 6 a view also similar to Fig. 2, but illustrating certain other variations in construction,—said Fig. 6 also illustrating a tongueless cultivator.

In said drawings the portions marked A represent the arched axle of the cultivator; B, the wheel; C, the tongue; D, the double-tree; E, the single-trees; F, the plow-beams; G, the plow-handles; H, spring attachments serving to assist in raising the plows; I, standards supported by the horizontal portions of the axles A; J, levers carried by said standards; K, connecting rods shown as running from one end of said levers to the plow-handles; L, rods running from the other ends of said levers down to and connecting with the draft-rods; M, said draft rods, and N a structure secured to the front ends of the plow-beams to which the draft rods are united.

The several parts A B C D E F G and H are or may be of a usual and well known or any desired construction, and will not, therefore, be further described herein, except incidentally in describing my said invention.

The standards I are mounted upon the horizontal portions of the axle A, between the wheels and the upright portions, and extend up alongside said upright portions to such points as may be desired. In cultivators having a tongue, such as that shown in all the drawings except Fig. 6, these standards may be dispensed with, and the lever J pivoted directly to the upright portions of the axles A (as shown in Fig. 5) or to suitable attachments thereto. In tongueless cultivators the separate supports become more necessary, owing to the greater and different movements of the axle A. These supports I are supports merely, and may be of any appropriate form or construction.

The levers J are pivoted to appropriate points on the supports I, (or the uprights of the arched axles,) and should be elbow-shaped, the pivots *i* being at or near the bends. An appropriate position and arrangement of these levers is illustrated in the drawings, (most plainly in Figs. 2, 5 and 6,) but, obviously, these may be varied without departing from my invention.

The connecting rods K are attached at one end to the handles G, or some other convenient portion of the plow frame structure, by pivots g, and at the other end to the rearward arm of the lever J, preferably by a universal or ball-and-socket joint,—the latter being shown. These rods are preferably each composed of two parts united by a pivot k, each part being also provided with a projection k' which rests on the back of the other, the ends of the two parts each extending a little distance beyond the pivot. One part is also preferably provided with a handle K² to assist in raising it, and thus "breaking" the joint. This is for the purpose of throwing this connecting rod out of effective engagement, thus permitting the plow handles and plows to be raised (see Fig. 5) without wholly detaching the device. In use, this rod is generally in compression, as will be presently more fully explained.

The rods L extend from the forward ends of the levers J, where they are connected by pivots j, downwardly, to in front of the forward ends of the plow-beams, where they preferably curve backwardly, and are bifurcated, and are preferably provided with the anti-friction trucks l. The rearwardly-extending and bifurcated portion is practically a continuation of the draft-rod M.

The draft-rods M are connected to the rods L by the pivots l' and extend forward, and, in the principal construction shown, are connected to the lower ends of the bars E' which carry the single-trees E.

The structure N shown in the principal figures of the drawings is secured rigidly to the couplings for the plow-beams on the forward side of the axle A. As shown, they are castings having vertical slots in which the anti-friction trucks l are placed, and which form ways for said trucks, up and down which they can travel. They may, however, be dispensed with, as shown in Fig. 5.

As shown, the forward ends of the levers J and the upper ends of the bars L are provided with numerous holes, to any of which the pivot j which unites them may be shifted, thus varying the leverage, as may be required. The bars E' carrying the single-trees are also provided with numerous holes, in any of which the single-tree attachments can be placed.

In setting out to do work with a cultivator provided with my invention, these various attachments are so adjusted that the plows will enter the ground to the desired depth, according to the character or requirements of the work. Where the ground is of the average or medium consistency, with the apparatus so adjusted, my invention will have little if any effect, as such adjustment will bring the average or medium pull upon the normal line of draft. Should a piece of softer ground be entered, the pull, of course, decreases, unless, as is the tendency with implements unprovided with my invention, the plows sink deeper. Where my invention is used, this tendency immediately corrects itself, for, as the draft grows lighter, the tendency of the point of attachment between the bar L and the draft rod M is to rise to a position above the line of draft, which operates, through the apparatus described, to restore the normal or predetermined condition. When harder ground is struck, the tendency is to throw the point of union between the bar L and draft rod M to below the line of draft, and again the apparatus at once operates to correct this tendency, and force the plows again to the normal or predetermined depth. To properly understand this operation it must be remembered that the pull is upon the plows or shovels, which have a tendency to enter the ground deeper or shallower, as it is softer or harder, which shifts the relation of the line of draft to the other parts; but this shifting is immediately corrected, as has been explained.

As will be readily understood, therefore, my attachment is perfectly automatic; and the predetermined depth of plowing is maintained continuously without regard to the consistency of the ground, as I have determined by actual practical test.

Figure 6:
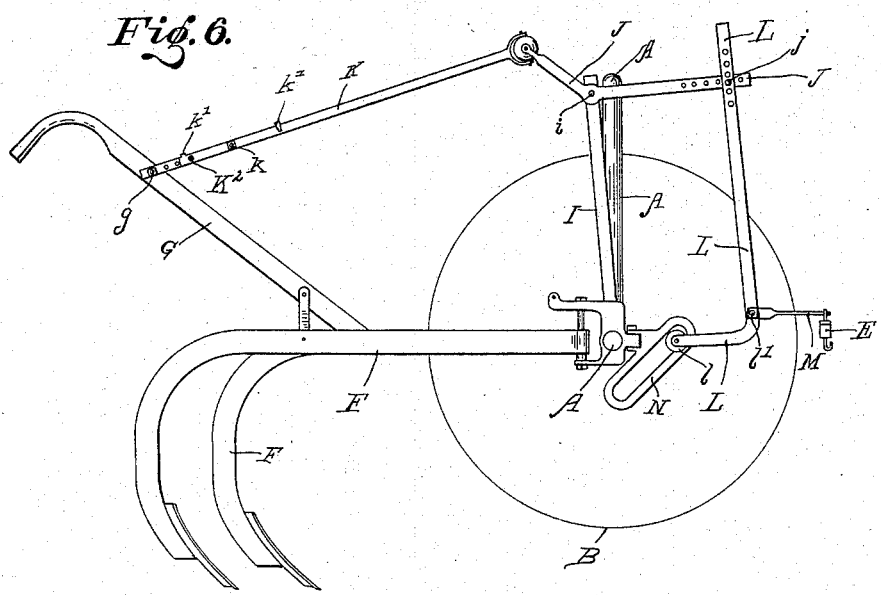

I have described and shown in the principal views a machine embodying my invention in a desirable form; but said invention is obviously capable of many different constructions, and I do not desire to be understood as confining myself to any of the details of construction shown, but only to the general arrangement. Obviously, anti-friction trucks may be dispensed with, as shown in Fig. 5; but they are a convenience and advantage, for the same reason that anti-friction trucks are an advantage in any movable point of contact between two parts. As further shown in said Fig. 5, substantially the same results may be attained by continuing the draft-rods M back and pivoting them to the plow attachments, making a joint in said draft rods at the points where the rods L are connected thereto. In that case the draft rods M, under light or medium draft, assume an elbow shape under proper adjustment; but under heavier draft would be straightened to a greater or less extent, and the effect will be precisely the same as in the construction shown. A still greater force can be provided for by inclining the structure N, as shown in Fig. 6, so that said structure will become a cam, up and down which the anti-friction trucks will roll; and many other variations of construction may be made, including cams of various other forms, none of which would be a departure from my invention.

Having thus fully described my said invention, what I claim as new, and desire to secure by Letters Patent, is—

1. The combination, in a draft attachment for plows or cultivators, of a lever pivoted above the axle, a rod running from one end of said lever back to the plow-frame structure, a rod running from the other end of said lever down to the draft rod, and said draft rod.

2. The combination, in a draft attachment for plows and cultivators, of a device connecting the draft-rod to the plow composed of two parts, one of which parts is adapted to be raised and lowered relative to the axle, a rod connected to the movable part, a lever carrying said rod, and a second rod extending from said lever to the plow-frame structure.

3. The combination, in a draft attachment for plows or cultivators, of a lever pivoted above the axle, a rod running from the rear end of said lever backwardly to the plow-frame structure, a rod running from the forward end of said lever down to a point in front of the axle and there attached to the draft-bar, said draft-bar, and a slotted device connected to the front end of the plow-beam, whereby the draft-attachment is made, and whereby the point of application of power is permitted to be automatically vertically varied, substantially as set forth.

4. The combination, in a draft attachment for plows and cultivators, of a draft-rod vertically movable at the point of attachment to the plow structure, a lever pivoted above the axle, a connection between said lever and said draft-rod, and a support for the forward end of the draft-rod.

In witness whereof I have hereunto set my hand and seal, at Indianapolis, Indiana, this 26th day of September, A. D. 1894.

WILLIAM R. TEEGUARDEN. [L. S.]

Witnesses:
 CHESTER BRADFORD,
 JAMES A. WALSH.